Feb. 25, 1930.  S. PRAWAT ET AL  1,748,793
EMERGENCY VALVE FOR RAILWAY AIR BRAKES
Filed April 25, 1927
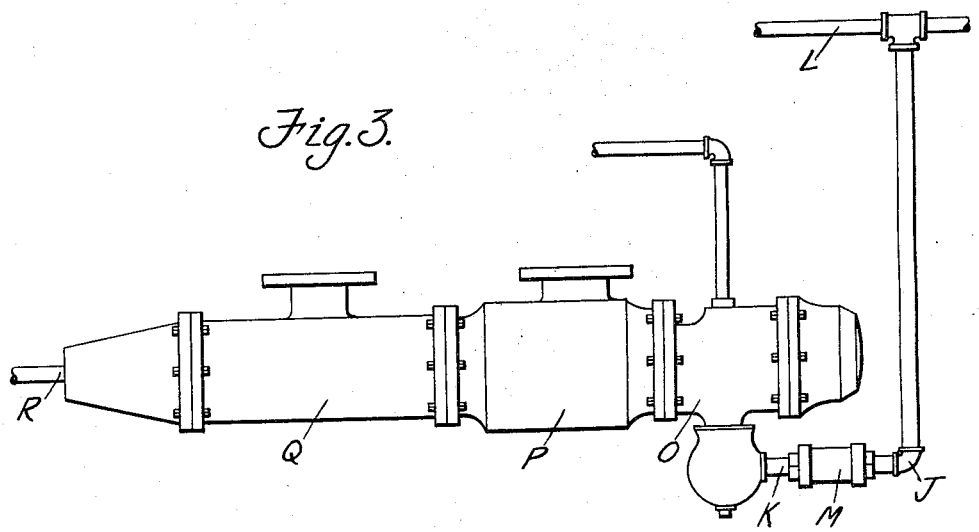
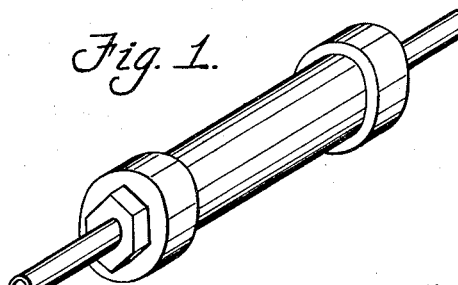
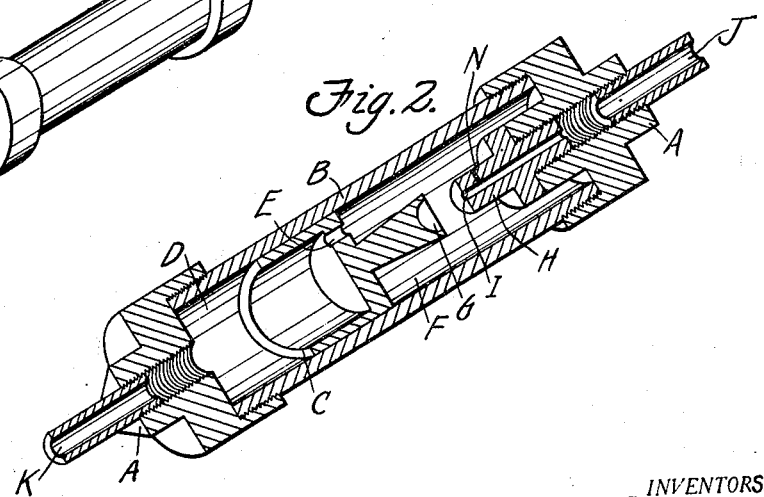
INVENTORS.
Stanley Prawat.
and William J. Kreczmer.
BY
ATTORNEY.

Patented Feb. 25, 1930

1,748,793

UNITED STATES PATENT OFFICE

STANLEY PRAWAT AND WILLIAM J. KRECZMER, OF SOUTH BEND, INDIANA

EMERGENCY VALVE FOR RAILWAY AIR BRAKES

Application filed April 25, 1927. Serial No. 186,527.

The invention relates to emergency and safety valves for air brake systems of railway trains, and has for its object to provide a device of this character in the pipe line system, which valve is normally balanced by pressure in the line, but which is moved to a seated position upon breaking of the pipe line or hose connection, and in which position exhaust of air from the brake cylinder is by-passed through reduced ports, thereby preventing the sudden application of the brakes, which often causes the cars of the train to be derailed.

A further object is to provide the slidable valve, which cooperates with the main air supply port with a reduced port, through which air passes to the opposite side of the valve when seated, and forming means whereby upon reduction of pressure in the brake cylinder, incident to a broken pipe line, air will gradually exhaust until pressure is built up on the opposite side of the slidable valve sufficiently to unseat the valve and allow an exhaust of a greater volume of air and final setting of the brake.

A further object is to provide the intake nipple, which extends into the valve cylinder with a side air port and the slidable valve with an extension, which extension, upon initial loss of pressure engages the end of the nipple and prevents exhaust of air therethrough, thereby by-passing the exhaust air which passes through the port in the valve to the nipple and pipe line through the side port in the nipple.

A further object is to provide the ends of the cylinder with removable caps to which air pipes are connected, and one of said caps with a threaded projection extending into the end of the cylinder, and in which projection the nipple is threaded.

A further object is to provide the slide valve with a port of substantially the same size as the usual emergency valve port, thereby allowing said valve to be controlled by the emergency valve and to balance itself incident to the pressure on emergency application.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawings:

Figure 1 is a perspective view of the valve casing.

Figure 2 is a vertical longitudinal sectional view through the valve casing and valve.

Figure 3 is a side elevation of the valve showing the same applied to a portion of a conventional form of air brake system.

Referring to the drawings the letter A designates the caps into which the cylinder B is threaded and slidably mounted in the cylinder B is a valve C, which valve reciprocates under certain conditions in the chamber ends D and F air passing through the port E in the valve. The port E is preferably of the same size as the usual port in the emergency valve, therefore it will be seen that when the system is under pressure, said valve C will be balanced within the cylinder B. One end of the slide valve C is provided with an extension G, which extension, upon loss of pressure moves towards the nipple H and into engagement with the end thereof, thereby cutting off the flow of air from the chamber F through the port I in the nipple, consequently prevents the rapid exhausting of air during the brake setting operation, thereby obviating the quick setting of the brakes which locks the wheels, causes them to slide on the rails and also causes derailing. Threaded into the bushing A at one end of the valve casing is a supply pipe J which leads to the train line L, and threaded into the other bushing A is a pipe K. The pipe K leads to the triple valve of the system, and upon loss of pressure in the main line L, incident to the breaking of the pipe line, or a connection in the pipe line between cars, it will be seen that the air will be exhausted through the pipe J, and service pipe L, and thence to the atmosphere at the point of break. In Figure 3 the location of the valve in the system is shown at M. Nipple H is provided with an exhaust port N in its side, and it will be seen that when the extension G is seated against the inner end of the nipple H, the air will pass from the pipe K to the chamber D, thence through the port E in the valve, and will simultaneously move the valve to closed position. The air which passes through the port E to the chamber F will then pass through the port N to the nipple chamber I, and thence through the pipe J to the service line L. This action retards the exhausting operation to a certain extent and prevents the too rapid setting of the brakes. As the pressure builds up in the chamber F on the nipple side of the valve, said pressure will slightly unseat the valve C and the brakes will then be positively set, therefore it will be seen there is a delayed or retarded application of the brakes.

The pipe K is connected to the usual triple valve mechanism O, which is carried by the reservoir P, and to which reservoir is connected the usual brake cylinder Q, having a brake rod R, which controls the brake. The valve C has a sliding fit within the cylinder B, and under normal conditions when the pressure is in the line, said valve is balanced, that is substantially in the position shown in Figure 2, as the pressure is equal on both sides thereof. Immediately upon the breaking of the pipe line, the pressure lowers on one side of the valve, consequently the high pressure on the other side immediately seats the same against the nipple H, and prevents the exhausting of air through the relatively small port I, and by-passes the same through the port end, which is relatively small, therefore it will be seen that the air will exhaust slowly, consequently there will be a slow application of the brakes until the pressure is built up on the opposite side of the valve, and which pressure will eventually unseat the valve and allow a more rapid exhaust of air and final setting of the brakes against the wheels. The slow application prevents the sudden and positive setting of the brakes against the wheels, which is the main difficulty now experienced with air brake systems.

From the above it will be seen that a sliding valve is provided in connection with an air brake system, which sliding valve will under normal pressure conditions not interfere with the operation of the brake as said valve is balanced incident to the equal pressure on opposite sides thereof, but upon breaking of the pipe line, said valve will be overbalanced incident to the difference of pressure on the exhaust side thereof, consequently the valve will be moved to a position where it will cut off the rapid flow or exhausting of air to the atmosphere and will by-pass the further exhaust of air through a restricted post for insuring a slower or retarded setting of the brakes.

The invention having been set forth what is claimed as new and useful is:—

1. The combination with an air brake supply pipe, or means carried thereby whereby upon breaking of the supply pipe there will be a slow application of the brakes, said means comprising a valve casing, a valve slidably mounted in said casing and having a port therethrough, a nipple in one end of the casing, said valve cooperating with the end of said nipple whereby upon loss of pressure on one side of the valve said valve will seat against the nipple and further exhaust to the atmosphere will be through a by-pass port in the nipple.

2. The combination with an air brake supply pipe line, a branch line carried thereby, a brake controlling mechanism carried by said branch line and operated by pressure from the branch line, of a valve casing carried by the branch pipe, a valve slidably mounted in said branch pipe and having a port therethrough, said valve being normally balanced by the pressure in the branch pipe, a nipple having a port therethrough, said nipple being threaded in the end of the casing, an extension carried by said valve and cooperating with one end of the nipple, whereby upon loss of pressure on the extension side of the valve said extension will seat against the nipple and by-pass further exhausted air through a restricted port in the nipple, whereby a slow application of brakes is obtained.

3. The combination with an air supply pipe of an air brake system, of means whereby upon loss of pressure incident to breaking of the air supply pipe, there will be a slow application of the brakes, said means comprising a valve casing, caps carried by the ends of said valve casing, the pipe line being connected to said caps, a nipple threaded into one of said caps and extending into the casing and having a port longitudinally therethrough and a restricted port in the side thereof, a valve slidably mounted in said casing and having a port therethrough, an extension carried by one end of said valve, said extension being in the path of the nipple and forming means whereby upon loss of pressure on the nipple side of the valve said extension will seat against the nipple and cause the exhausted air to be by-passed through the side of the nipple thereby restricting the exhaust of air and retarding the application of the brakes.

4. The combination with an air supply pipe of an air brake system, of means carried by said air supply pipe for retarding the setting of the brakes, said means comprising a valve, said valve being slidably mounted in a valve casing and having a port therethrough, said valve cooperating with a valve seat at one end of the casing whereby upon loss of pressure on one side of the valve rapid exhaust of air is prevented and air bypassed through a restricted port and upon equalization of pressure on both sides of the valve said valve will be unseated, thereby allowing final exhaust and setting of the brakes.

5. The combination with an air brake supply pipe, of a valve casing interposed in said pipe, a normally pressure balanced valve having a bleed port therethrough disposed in said casing and adapted to close said pipe upon unequal pressure in said casing, and by-pass means other than the bleed port cooperating with said port to permit a restricted flow of air to pass through said pipe when said valve is in closed position.

6. The combination with an air brake supply pipe, of a valve casing interposed in said pipe, a pressure controlled valve in said casing having a bleed port therethrough, and by-pass means other than the bleed port from said casing to said pipe, said valve being adapted to momentarily close the pipe upon unequal pressure in the casing, to momentarily rebound, and to again close said pipe, whereupon pressure in said pipe will be equalized through said by-pass.

7. The combination with an air brake supply pipe, of a valve casing interposed in said pipe, and a pressure controlled valve having a bleed port therethrough mounted in said casing and adapted under the influence of an unequal pressure to seat and unseat momentarily and then reseat against said pipe, and a by-pass means other than the bleed port permitting a restricted flow of air to pass through said pipe upon final seating of the valve.

STANLEY PRAWAT.
WILLIAM J. KRECZMER.